(12) United States Patent
Ellans et al.

(10) Patent No.: US 8,726,674 B2
(45) Date of Patent: May 20, 2014

(54) PROPULSION UNIT

(75) Inventors: Christopher J. Ellans, Derby (GB); John H. Martin, Indianapolis, IN (US)

(73) Assignee: Rolls-Royce PLC, London (GB)

( * ) Notice: Subject to any disclaimer, the term of this patent is extended or adjusted under 35 U.S.C. 154(b) by 557 days.

(21) Appl. No.: 12/824,721

(22) Filed: Jun. 28, 2010

(65) Prior Publication Data

US 2011/0030385 A1 Feb. 10, 2011

(30) Foreign Application Priority Data

Aug. 7, 2009 (GB) .................................. 0913801.7

(51) Int. Cl.
*F02C 7/26* (2006.01)
*F02C 7/06* (2006.01)
*F02C 7/275* (2006.01)

(52) U.S. Cl.
USPC ................. 60/786; 60/39.08; 60/788

(58) Field of Classification Search
USPC ..................... 60/226.1, 39.08, 802, 786, 778; 186/6.11
See application file for complete search history.

(56) References Cited

U.S. PATENT DOCUMENTS

| | | | | | |
|---|---|---|---|---|---|
| 272,313 | A | * | 2/1883 | Eick et al. | ...................... 246/316 |
| 2,525,694 | A | * | 10/1950 | Lindsey et al. | .................. 416/36 |
| 4,062,185 | A | * | 12/1977 | Snow | ............................... 60/204 |
| 4,062,186 | A | * | 12/1977 | Snow et al. | .................... 60/226.1 |
| 4,887,424 | A | * | 12/1989 | Geidel et al. | .................. 60/39.08 |
| 5,735,116 | A | * | 4/1998 | Mouton | ..................... 60/39.091 |
| 5,845,483 | A | * | 12/1998 | Petrowicz | ........................ 60/788 |
| 7,418,821 | B2 | * | 9/2008 | Butt | ................................ 60/778 |
| 7,707,909 | B2 | * | 5/2010 | Linet et al. | ....................... 74/720 |
| 2006/0272313 | A1 | * | 12/2006 | Eick et al. | ..................... 60/39.63 |

OTHER PUBLICATIONS

Giampaolo, Gas turbine handbook, Feb. 2009, The Fairmont Press, 4th edition, p. 105.*
British Search Report issued in corresponding British Patent Application No. 0913801.7, completed Nov. 23, 2009.

* cited by examiner

*Primary Examiner* — Gerald L Sung
*Assistant Examiner* — William Breazeal
(74) *Attorney, Agent, or Firm* — Oliff PLC

(57) ABSTRACT

A turboprop propulsion unit for an aircraft comprises a propeller 22 which is driven by a core engine by means of a propeller turbine 26 which drives the propeller 22 through a shaft 28 and a propeller gearbox 24. Restarting of the engine in flight is achieved by windmilling of the propeller 22, which drives a propeller gearbox lubricant pump 30. A diverter valve 40 causes lubricant delivered by the propeller gearbox lubricant pump 30 to be supplied to a turbomachinery lubricant pump 18 along a restart conduit 44, so as to drive the turbomachinery lubricant pump 18 as a motor. Torque generated by the turbomachinery lubricant pump 18 is transferred through an accessory gearbox 12 to a spool 4, 6, 8 of the core engine 2 and to a fuel pump 16. Control of the pitch of blades 36 of the propeller 22 enables the windmilling propeller 22 to achieve a desired speed of the spool 4, 6, 8 and output of the fuel pump 16 sufficient to restart the engine 2, even at low air speeds.

7 Claims, 1 Drawing Sheet

PROPULSION UNIT

Figure 1:
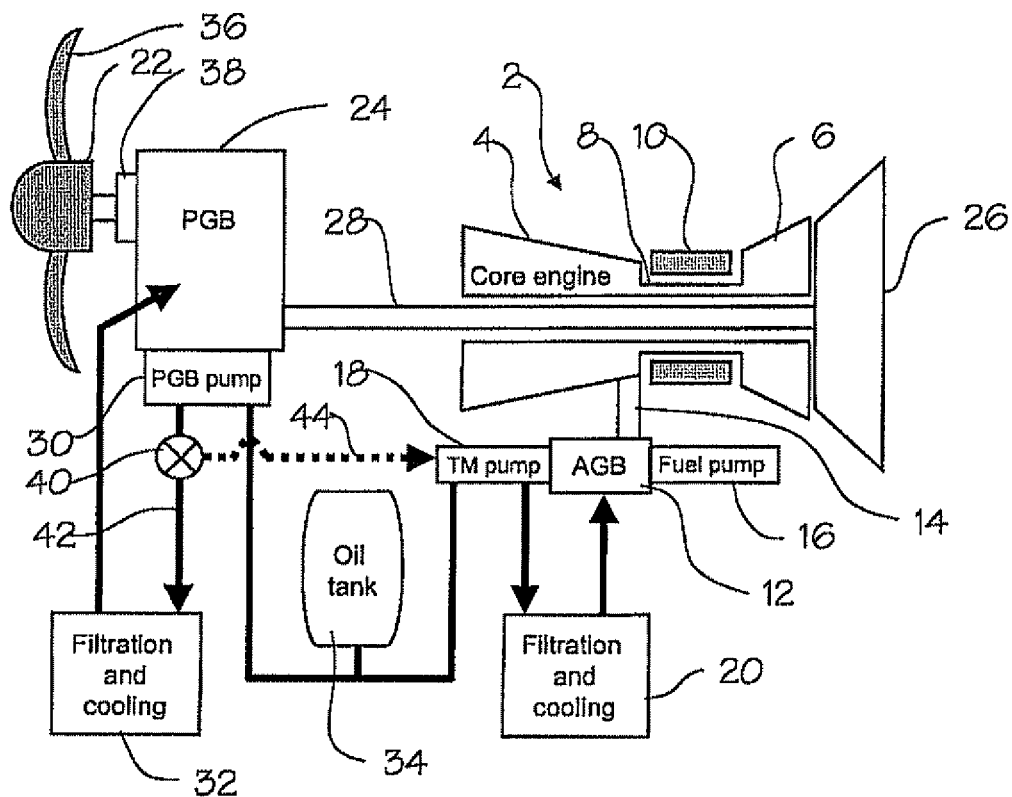

This invention relates to a propulsion unit comprising a gas turbine engine and a propeller, and is particularly, although not exclusively, concerned with a turboprop propulsion unit in which the propeller is driven by a first spool of the gas turbine engine through a propeller gearbox.

In this specification, the word "propeller" is to be interpreted broadly to embrace not only bladed propulsion devices for providing forward movement of an aircraft, but also other similar devices, such as fans and rotors, for example of helicopters. Similarly, the expression "propulsion unit" includes units for generating lift as well as units for causing forwards, backwards or lateral movement.

Gas turbine engines are started by rotating a core engine spool, comprising a compressor and a turbine mounted on a common shaft, and by supplying fuel under pressure to a combustor. When the core spool reaches a predetermined minimum speed, the fuel is injected and ignited. When an aircraft is one the ground, power can be supplied from a ground-based equipment to rotate the core spool and drive the fuel pump. However, alternative engine starting means must be employed if flame out occurs during flight.

It is known, for example from U.S. Pat. No. 5,845,483, to use the so-called "windmilling" effect to restart, or relight, an engine in flight after it has flamed out or been shut down by the pilot. The windmilling effect is the rotation of a bladed component of the propulsion unit by the airstream flowing past it, normally as a result of the forward movement of the aircraft.

The forward speed of the aircraft governs the core spool speed which can be achieved by windmilling. A minimum core spool speed, and consequently a minimum aircraft forward speed, is required to drive the fuel pump fast enough to deliver adequate fuel flow for windmilling restart to occur. It is desirable for the minimum forward speed required to restart the engine to be as low as possible, in order to maximise the overall restart envelope. A low forward speed for restart minimises the glide slope angle required, so that engine restart can be achieved with minimum loss of altitude.

U.S. Pat. No. 5,845,483 discloses an engine starting system which comprises an assist pump from a fan shaft so that windmilling of the fan drives the pump. The fan pressurises oil which is supplied to an assist motor which drives the core spool to restart the engine. The assist pump and the assist motor are components which are additional to those required for normal operation of the engine and so carry a substantial weight penalty.

According to the present invention there is provided a propulsion unit comprising a gas turbine engine and a propeller which is driven by a first spool of the gas turbine engine through a propeller gearbox provided with a propeller gearbox lubricant pump, the gas turbine engine having an accessory gearbox driven by a second spool of the engine and having a turbomachinery lubricant pump driven from the accessory gearbox, a restart conduit being provided for supplying fluid delivered by the propeller gearbox lubricant pump to the turbomachinery lubricant pump whereby windmilling of the propeller drives the propeller gearbox lubricant pump and thence the turbomachinery lubricant pump to drive the second spool through the auxiliary gearbox to enable restarting of the engine.

A diverter valve may be provided for directing fluid delivered by the propeller gearbox lubricant pump to the conduit.

A fuel pump of the engine may be driven from the auxiliary gearbox, whereby the fuel pump may be driven by windmilling of the propeller.

The propeller gearbox lubricant pump may comprise a primary pumping element for supplying lubricant to the propeller gearbox and a secondary pumping element for supplying lubricant via the conduit to the turbomachinery lubricant pump. A control valve may be provided for controlling the supply of fluid to an inlet of the secondary pumping element.

The turbomachinery lubricant pump may comprise a pumping element for supplying lubricant to engine components, and a motor element which is drivable by lubricant supplied from the propeller gearbox lubricant pump during restarting of the engine by means of windmilling of the propeller.

The propeller may be provided with variable pitch blades which are controllable during windmilling to provide a desired rotational speed of the second spool for restarting.

For a better understanding of the present invention, and to show more clearly how it may be carried into effect, reference will now be made, by way of example, to the accompanying drawings, in which:—

FIG. 1 is a schematic view of a turboprop aircraft propulsion unit; and

Figure 2:
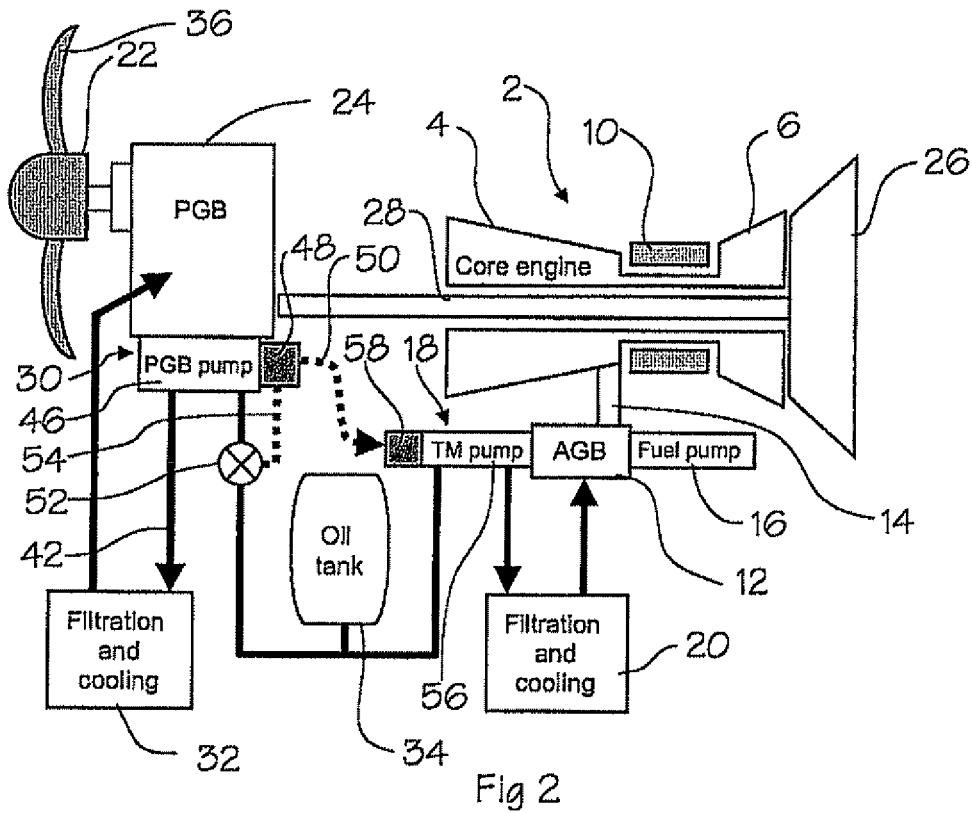

FIG. 2 corresponds to FIG. 1 but shows a variant of the propulsion unit.

The propulsion unit shown in FIG. 1 comprises a core engine 2 comprising a compressor 4 and a turbine 6 which are interconnected by a shaft 8. A combustor 10 is situated between the compressor 4 and the turbine 6. An accessory gearbox 12 has an input driven from the shaft 8 by means of a radial power take-off shaft 14. Outputs of the accessory gearbox 12 drive various components, including a fuel pump 16 and a turbomachinery lubricant pump 18. The lubricant pump 18 supplies lubricant, such as oil, to various systems of the engine, including the accessory gearbox 12 and bearings of the shaft 8. Lubricant supplied by the lubricant pump 18 is filtered and cooled, as indicated at 20.

A propeller 22 is driven through a propeller gearbox 24 by means of a turbine 26, which transmits power to the propeller gearbox 24 through a shaft 28 which extends within the shaft 8. The shaft 28 and the turbine 26 constitute a first spool of the propulsion unit, and the compressor 4, the turbine 6 and the shaft 8 constitute a second spool. It will be appreciated that the core engine 2 may comprise two spools instead of the single spool 4, 6, 8 shown in FIG. 1.

The propeller gearbox 24 is provided with a propeller gearbox lubricant pump 30 which supplies lubricant along an outlet line 42 to the propeller gearbox 24 via filtration and cooling devices 32. Lubricant is supplied to inlets of the turbomachinery lubricant pump 18 and the propeller gearbox lubricant pump 30 from an oil tank 34.

The propeller 22 comprises blades 36. The blades 36 have a variable pitch, which can be controlled by a pitch control unit 38.

A diverter valve 40 is situated in the outlet line 42 and is operable to divert the flow from the propeller gearbox lubricant pump 30 to the turbomachinery lubricant pump 18 along a restart conduit 44. Thus, pressurised lubricant delivered by the propeller gearbox lubricant pump 30 can be supplied entirely to the propeller gearbox 24 through the filtration and cooling devices 32, entirely to the turbomachinery lubricant pump 18 along the line 44, or to both the propeller gearbox 24 and the turbomachinery lubricant pump 18.

In normal operation of the propulsion unit shown in FIG. 1, air is compressed by the compressor 4, and the compressed air is ignited in the combustor 10. The combustion products flow through the turbine 6 causing it to maintain rotation of the spool 4, 6, 8. Combustion products exhausted from the turbine 6 drive the turbine 26. The rotation of the turbine 26 is transferred by the shaft 28 to the propeller gearbox 24, from which the propeller 22 is driven. The pitch of the blades 36 is adjusted by means of the pitch control unit 38 to adopt an optimal angle of attack in dependence on the air speed of the aircraft.

The accessory gearbox 12 is driven from the core engine spool 4, 6, 8 by means of the radial shaft 14, and drives the fuel pump 16 to maintain the fuel supply to the combustor 10, and also drives the turbomachinery lubricant pump 18 to maintain the lubricant supply to the accessory gearbox 12 and other engine systems.

The propeller gearbox lubricant pump 30 is driven by a take-off shaft (not shown) from the propeller gearbox 24 and maintains the circulation of lubricant within the propeller gearbox 24.

If flame-out occurs while the aircraft is airborne, restarting requires both the core engine spool 4, 6, 8 to be rotated at a speed sufficient for restarting to occur, and the fuel pump 16 to be driven at a sufficient speed to provide fuel to the combustor 10 at the required flow rate and pressure.

It is common practice for blades 36 of the propellers 22 to be feathered in the event of flame-out in order to minimise drag on the aircraft caused by windmilling of the propeller 22 and the associated losses occurring within the engine. This is typically achieved automatically by the pitch control unit 38. However, for restarting of the engine shown in FIG. 1, the pitch control unit 38 is adjusted to move the blades 36 away from the feathered position. Also, the diverter valve 40 is operated to divert lubricant delivered by the propeller gearbox lubricant pump 30 along the restart conduit 44 to the turbomachinery lubricant pump 18. Consequently, windmilling of the propeller 22 drives the propeller gearbox lubricant pump 30 through the propeller gearbox 24, and the resulting lubricant delivered to the turbomachinery lubricant pump 18 causes it to be operated as a motor, which then applies torque to the accessory gearbox 12. This torque serves both to drive the fuel pump 16 and to rotate the core engine spool 4, 6, 8 through the radial shaft 14. The speed of rotation of the core engine spool 4, 6, 8 and the delivery of the fuel pump 16 can be controlled by appropriate adjustment of the pitch of the blades 36 by way of the pitch control unit 38, so that the restarting conditions can be met over a wide range of aircraft air speeds. When the core engine 2 has restarted successfully, normal operation is resumed by returning the diverter valve 40 to its operational position in which the delivery of the propeller gearbox lubricant pump 30 is directed through the filtration and cooling devices 32 to the propeller gearbox 24, and the pitch control unit 38 adjusts the pitch of the blades 36 to provide thrust.

It will be appreciated that the turbomachinery lubricant pump 18 must be of a type which is capable of functioning as a pump when driven from the accessory gearbox 12, and as a motor when supplied with lubricant under pressure from the propeller gearbox lubricant pump 30 through the restart conduit 44. For example, the turbomachinery lubricant pump 18 may comprise a centrifugal impeller which is capable of being driven as a turbine by lubricant supplied under pressure to the pump inlet.

The propulsion unit shown in FIG. 2 is similar in many respects to that of FIG. 1. However, in the variant of FIG. 2, the propeller gearbox lubricant pump 30 comprises a first pumping element 46, which delivers lubricant via the outlet line 42 through the filtration and cooling devices 32 to the propeller gearbox 24, and a second pumping element 48 which is connected by a restart conduit 50 to the turbomachinery lubricant pump 18. Instead of the diverter valve 40 provided in the delivery line 42 of the propeller gearbox lubricant pump 30, the variant of FIG. 2 has a control valve 52 situated in the supply line from the oil tank 34 to the propeller gearbox lubricant pump 30. A restart supply line 54 extends between the diverter valve 52 and the second pumping element 48.

The turbomachinery lubricant pump 18 comprises a pumping element 56 and a motor element 58, to which the restart line 50 is connected.

To restart the core engine 2 of the unit shown in FIG. 2, the blades 36 of the propeller 22 are unfeathered as before, and the control valve 52 is operated to divert some or all of the lubricant from the oil tank 34 to the second pumping element 48. The second pumping element thus delivers lubricant under pressure through the restart line 50 to the motor element 58 of the turbomachinery lubricant pump 18. As before, the turbomachinery lubricant pump 18 is thus driven by pressurised lubricant supplied by the propeller gearbox lubricant pump 30, driven by windmilling of the propeller 22, to drive the core engine spool 4, 6, 8 and the fuel pump 16 to enable restarting of the core engine 2.

In the variant of FIG. 2, the second pumping element 48 and the motor element 58 can be configured for maximum efficiency during a restarting operation, without compromising these elements by the need to provide effective lubricant supply to the propeller gearbox 24 and the other engine systems in normal operation of the propulsion unit. Consequently, the minimum forward airspeed required for restarting can be further reduced.

Propulsion units as described above with reference to FIGS. 1 and 2 have a relatively large restart envelope and in particular can be restarted during flight at relatively low air speeds. Since the restarting systems utilise the existing propeller gearbox lubricant pump 30 and the turbomachinery lubricant pump 18, either without modification in the embodiment of FIG. 1 or with relatively minor modification in the embodiment of FIG. 2, no additional dedicated pump or motor need be provided beyond those required for normal operation. Consequently, any weight increase resulting from the restarting system is small.

The invention claimed is:

1. A propulsion unit for an aircraft, the propulsion unit comprising:
    a gas turbine engine including: first and second spools, an accessory gearbox driven by the second spool, a propeller gearbox provided with a propeller gearbox lubricant pump, and an integral turbomachinery lubricant pump driven from the accessory gearbox;
    a propeller configured to be driven by the first spool through the propeller gearbox; and
    a restart conduit configured to supply fluid delivered from the propeller gearbox lubricant pump to the turbomachinery lubricant pump, wherein
    windmilling the propeller drives the propeller gearbox lubricant pump and the turbomachinery lubricant pump to drive the second spool through the accessory gearbox to enable restarting of the engine, and the turbomachinery lubricant pump is formed of a centrifugal impeller that is configured to operate as a pump when driven from the accessory gearbox, and to operate as a motor when supplied with lubricant under pressure from the propeller gearbox lubricant pump through the restart conduit.

2. The propulsion unit as claimed in claim 1, further comprising:
    a fuel pump of the engine configured to be driven from the accessory gearbox whereby, during restarting, the fuel pump is driven by windmilling of the propeller.

3. The propulsion unit as claimed in claim 1, in which a diverter valve is provided for directing fluid delivered by the propeller gearbox lubricant pump to the conduit.

4. The propulsion unit as claimed in claim 1, wherein the propeller gearbox lubricant pump includes: (1) a primary pumping element configured to supply lubricant to the propeller gearbox, and (2) a secondary pumping element configured to supply lubricant to the turbomachinery lubricant pump.

5. The propulsion unit as claimed in claim 4, further comprising:
   a control valve configured to control the supply of fluid to an inlet of the secondary pumping element.

6. The propulsion unit as claimed in claim 1, wherein the turbomachinery lubricant pump includes: (1) a pumping element configured to supply lubricant to components of the engine, and (2) a motor element configured to be drivable by lubricant supplied from the propeller gearbox lubricant pump during restarting of the engine by means of windmilling of the propeller.

7. The propulsion unit as claimed in claim 1, wherein the propeller is provided with variable pitch blades, the pitch of the variable pitch blades being controllable during windmilling to provide a desired rotational speed of the second spool for restarting.

* * * * *